(12) United States Patent
Li

(10) Patent No.: US 10,705,717 B2
(45) Date of Patent: Jul. 7, 2020

(54) NOTEBOOK COMPUTER

(71) Applicant: Wuhan China Star Optoelectronics Technology Co., Ltd., Wuhan (CN)

(72) Inventor: Man Li, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 552 days.

(21) Appl. No.: 15/329,236

(22) PCT Filed: Dec. 27, 2016

(86) PCT No.: PCT/CN2016/112437
§ 371 (c)(1),
(2) Date: Jan. 25, 2017

(87) PCT Pub. No.: WO2018/090442
PCT Pub. Date: May 24, 2018

(65) Prior Publication Data
US 2018/0335915 A1    Nov. 22, 2018

(30) Foreign Application Priority Data

Nov. 21, 2016   (CN) .......................... 2016 1 1040612

(51) Int. Cl.
*G06F 3/0354* (2013.01)
*G06F 3/0488* (2013.01)
(Continued)

(52) U.S. Cl.
CPC ............ *G06F 3/0488* (2013.01); *G06F 1/165* (2013.01); *G06F 1/169* (2013.01); *G06F 1/3265* (2013.01);
(Continued)

(58) Field of Classification Search
CPC ............ H04M 1/72569; G06F 3/03547; G06F 3/1446; G06F 3/0412; G06F 3/038; A45C 13/002; G02F 1/13318
(Continued)

(56) References Cited

U.S. PATENT DOCUMENTS 5,327,161 A * 7/1994 Logan ..................... G06F 3/038
345/157
7,136,138 B1 * 11/2006 Sekiguchi ........... G02F 1/13318
349/162

(Continued)

FOREIGN PATENT DOCUMENTS

| CN | 200997094 Y | 12/2007 |
|---|---|---|
| CN | 203241885 U | 10/2013 |
| CN | 104079692 A | 10/2014 |

*Primary Examiner* — Abdul-Samad A Adediran
(74) *Attorney, Agent, or Firm* — Leong C. Lei

(57) ABSTRACT

The present invention provides a notebook computer. The notebook computer includes a secondary display screen that has a small size and a primary display screen that has a large size. The secondary display screen may be a touch display screen and is operable for solely displaying an image and conducting an input/output operation so that when the operation life of the notebook computer get short, the large-sized primary display screen can be shut down for reducing energy consumption, while the secondary display screen may be powered by the notebook computer or may be provided with an individual battery to supply electrical power thereto and may establish communication through a contact type connector with a main board of the notebook computer or communicate with the main body of the notebook computer through wireless communication modules, so that the notebook computer may possesses extended operation life and is also operable in multiple operation modes that can be selected and set by a user so as to improve user's experience and production competition power.

16 Claims, 6 Drawing Sheets

(51) Int. Cl.
  *G06F 1/3234*  (2019.01)
  *G06F 1/16*  (2006.01)
  *G09F 9/37*  (2006.01)
  *G06F 1/3287*  (2019.01)

(52) U.S. Cl.
  CPC ........ *G06F 1/3287* (2013.01); *G06F 3/03547* (2013.01); *G09F 9/37* (2013.01)

(58) Field of Classification Search
  USPC ................ 345/157, 173; 455/550.1; 349/162
  See application file for complete search history.

(56) References Cited

U.S. PATENT DOCUMENTS

| | | | |
|---|---|---|---|
| 2011/0117955 A1* | 5/2011 | Lee .................. | H04M 1/72569 455/550.1 |
| 2012/0194448 A1* | 8/2012 | Rothkopf ............ | A45C 13/002 345/173 |
| 2015/0130738 A1* | 5/2015 | Park ..................... | G06F 3/1446 345/173 |
| 2017/0277324 A1* | 9/2017 | Dan ...................... | G06F 3/0412 |
| 2018/0107327 A1* | 4/2018 | Perelli ................. | G06F 3/03547 |

* cited by examiner

NOTEBOOK COMPUTER

BACKGROUND OF THE INVENTION

1. Field of the Invention

The present invention relates to the field of computer technology and more particular to a notebook computer.

2. The Related Arts

The popularization of computer makes working and living of more and more families and individuals closely related to the computers. Notebook computers, due to convenience and light-weight, are widely accepted by more and more people.

Due to the characteristics of having excellent performances and being easy to carry, the notebook computers are becoming a necessary tool for business persons who travel frequently and participate in numerous meeting and conferences. However, battery life is a concern for the notebook computers in various applications. For example, in a conference or meeting, when the battery power is insufficient and there in no external power available, the issue of notebook computer battery life would severely affect a normal operation of the use and eventually leas to poor user's experience.

With reference to FIG. 1, a conventional notebook computer generally comprises a base casing 100 and a top lid 200 rotatably connected to the base casing 100. The base casing 100 is provided with a keyboard 110 and a touch pad 120. The top cover 200 is provided with a display screen 210 in the interior thereof. The base casing 100 is provided therein with a main board and a battery. In operations, the notebook computer receives electrical power from the battery or is connected to an external power supply to receive electrical power and uses the keyboard 110 and the touch pad 120 or an externally connected mouse to conduct an input image. The main board drives the display screen 210 to display an operation screen so that a user may interact with the notebook computer with the display screen 210. This design provides a fixed operation mode and does not provide any solution in case of insufficiency of battery life. Also, the outside appearance is monotonous with no innovation, making bad experience to the user.

Electronic ink screen, which is a new type of display screen and is common is electronic reader of Amazon.com Kindle, is made up of hundreds of thousands of microcapsules. These microcapsules are around one half of the diameter of one single hair and each of these microcapsules contains, suspending in liquid of purity, black particles that carry negative charges and white particles that carry positive charges. When a positive electric field or a negative electric field is applied, corresponding particles would move to the top of the microcapsule, making it ready observable by a user, and this makes such a surface area turning into white or black. The electric charges of each microcapsule may also be divided into two parts so as to show half black and half white on the surface. Separating the charges in this way makes it possible to utilize the screen resolution to the maximum extent and to create an imaging effect similar to printing made on a piece of paper. In addition, no light reflection phenomenon that is commonly seen in a traditional liquid crystal display under sunlight would occur. An important characteristic of the electronic ink screen is that electrical power is consumed only when the screen changes (such as from black into white) and images may still stay on the display screen after power is cut off, making it extremely power saving. Further, the electronic ink screen needs only two conductive substrates, so that it can be made extremely thin and can be made as a flexible and windable display screen if flexible substrates are involved.

SUMMARY OF THE INVENTION

An objective of the present invention is to provide a notebook computer that helps lower down energy consumption of the notebook computer, extends operation life of the notebook computer, enrich operation mode of the notebook computer, and improve user's experience and competition power of products.

To achieve the above objective, the present invention provides a notebook computer, which comprises: a base casing, a top cover rotatably connected to the base casing, a primary display screen arranged in the top cover, a main board in communication connection with the primary display screen, and a secondary display screen in communication with the main board;

wherein the secondary display screen is a touch display screen having a size smaller than a size of the primary display screen; and the main board supplies a drive control signal to selectively set the primary display screen to operate solely, or the secondary display screen to operate solely, or the primary display screen and the secondary display screen to operate at the same time.

A computer power supply is also included and is in electrical connection with both the main board and the primary display screen.

The base casing is provided with a contact type connector mounted thereto and the secondary display screen is operable, through the contact type connector, to communicate with the main board through and to receive electrical power from the computer power supply.

The secondary display screen is rotatably connected to the contact type connector so that the secondary display screen is rotatable with the contact type connector as a rotation axis.

The secondary display screen is provided with a battery and a first wireless communication module and the main board is provided with a second wireless communication module, the secondary display screen and the main board being operable to communicate with each other through the first wireless communication module and the second wireless communication module, the secondary display screen receiving electrical power from the battery.

The size of the secondary display screen is 4-6 inches.

The secondary display screen is an electronic ink screen.

The secondary display screen comprises a nanometer touch control layer, a solar energy layer, and an electronic ink layer stacked on each other.

The secondary display screen is provided with a touch switch and the touch switch allows for selection among the primary display screen being operated solely, the secondary display screen being operated solely, or the primary display screen and the secondary display screen being operated at the same time.

A keyboard is further included and mounted on the base casing.

The present invention also provides a notebook computer, which comprises: a base casing, a top cover rotatably connected to the base casing, a primary display screen arranged in the top cover, a main board in communication connection with the primary display screen, and a secondary display screen in communication with the main board;

wherein the secondary display screen is a touch display screen having a size smaller than a size of the primary display screen; and the main board supplies a drive control signal to selectively set the primary display screen to operate solely, or the secondary display screen to operate solely, or the primary display screen and the secondary display screen to operate at the same time;

and further comprising a computer power supply in electrical connection with both the main board and the primary display screen;

wherein the secondary display screen is provided with a touch switch and the touch switch allows for selection among the primary display screen being operated solely, the secondary display screen being operated solely, or the primary display screen and the secondary display screen being operated at the same time.

The efficacy of the present invention is that the present invention provides a notebook computer. The notebook computer comprises a secondary display screen that has a small size and a primary display screen that has a large size. The secondary display screen may be a touch display screen and is operable for solely displaying an image and conducting an input/output operation so that when the operation life of the notebook computer get short, the large-sized primary display screen can be shut down for reducing energy consumption, while the secondary display screen may be powered by the notebook computer or may be provided with an individual battery to supply electrical power thereto and may establish communication through a contact type connector with a main board of the notebook computer or communicate with the main body of the notebook computer through wireless communication modules, so that the notebook computer may possesses extended operation life and is also operable in multiple operation modes that can be selected and set by a user so as to improve user's experience and production competition power.

BRIEF DESCRIPTION OF THE DRAWINGS

For better understanding of the features and technical contents of the present invention, reference will be made to the following detailed description of the present invention and the attached drawings. However, the drawings are provided only for reference and illustration and are not intended to limit the present invention.

In the drawings.

DETAILED DESCRIPTION OF THE PREFERRED EMBODIMENTS

To further expound the technical solution adopted in the present invention and the advantages thereof, a detailed description will be given with reference to the preferred embodiments of the present invention and the drawings thereof.

Figure 1:
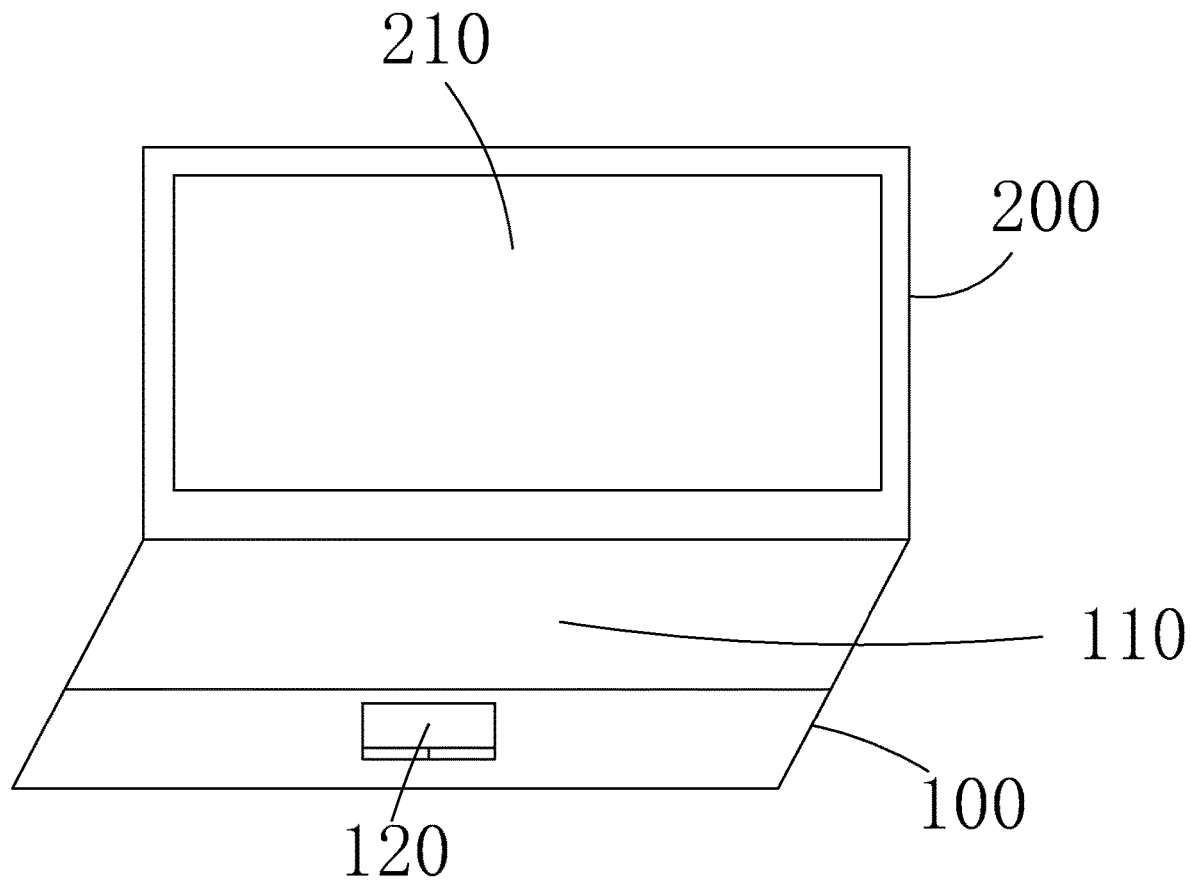
FIG. 1 is a schematic view showing the structure of a conventional notebook computer.
Figure 2:
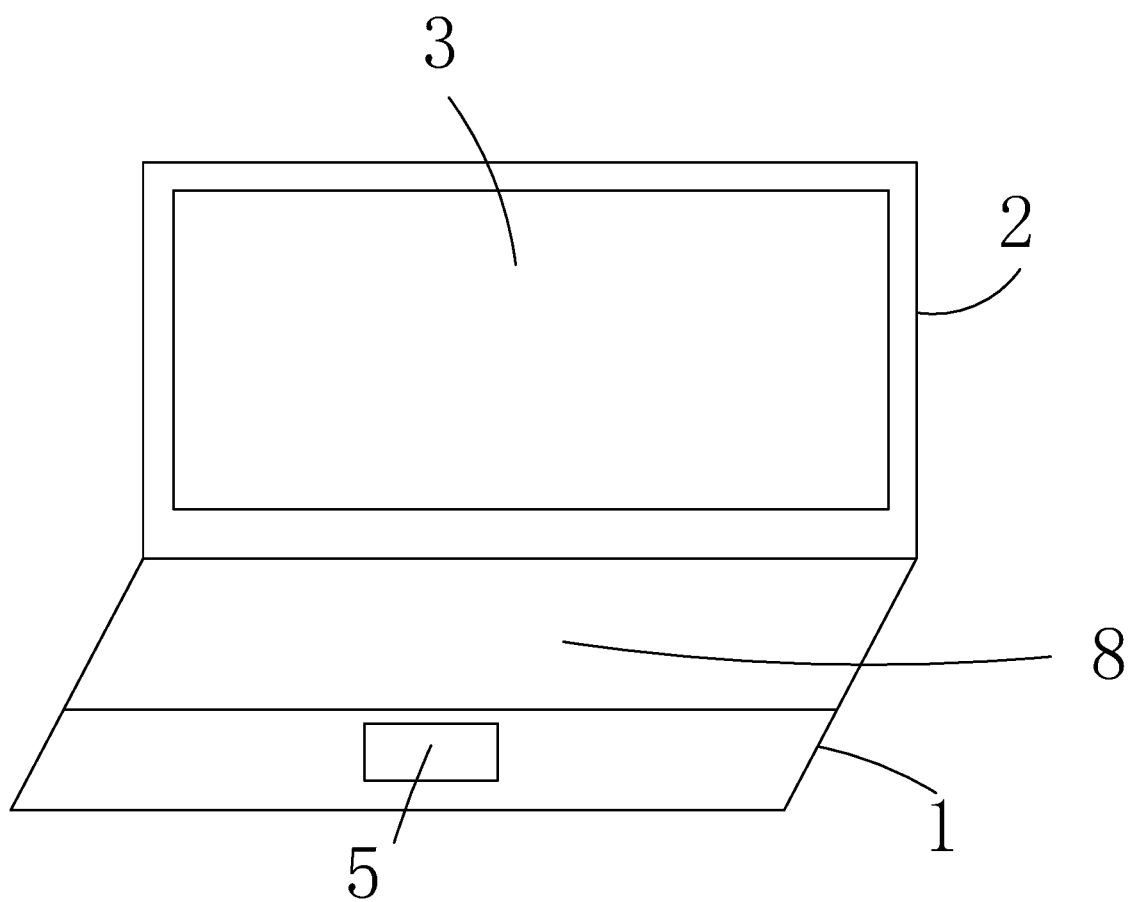
FIG. 2 is a schematic view showing a notebook computer according to the present invention taken at a first view angle.
Figure 3:
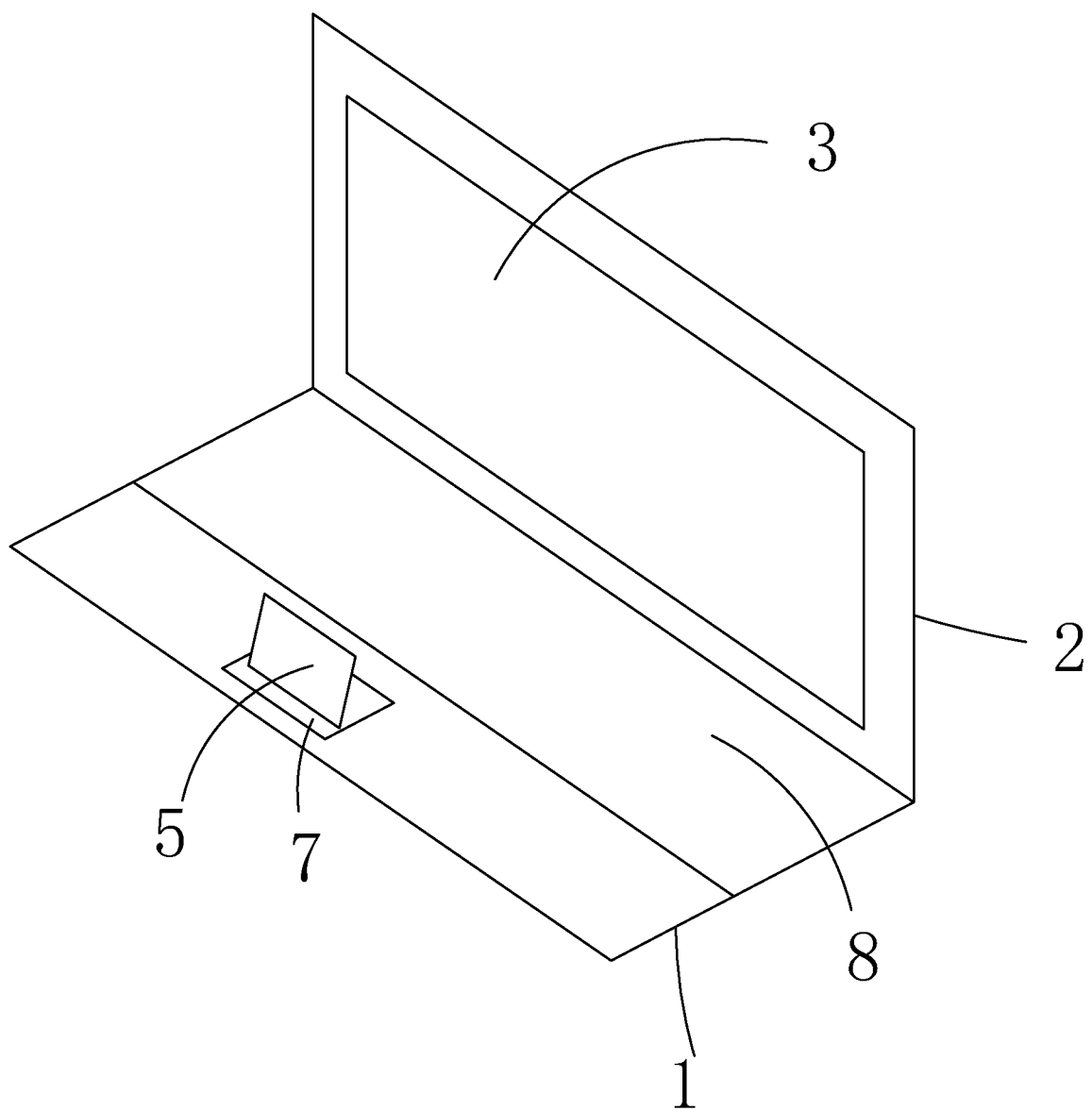
FIG. 3 is a schematic view showing a notebook computer according to the present invention taken at a second view angle.
Figure 4:
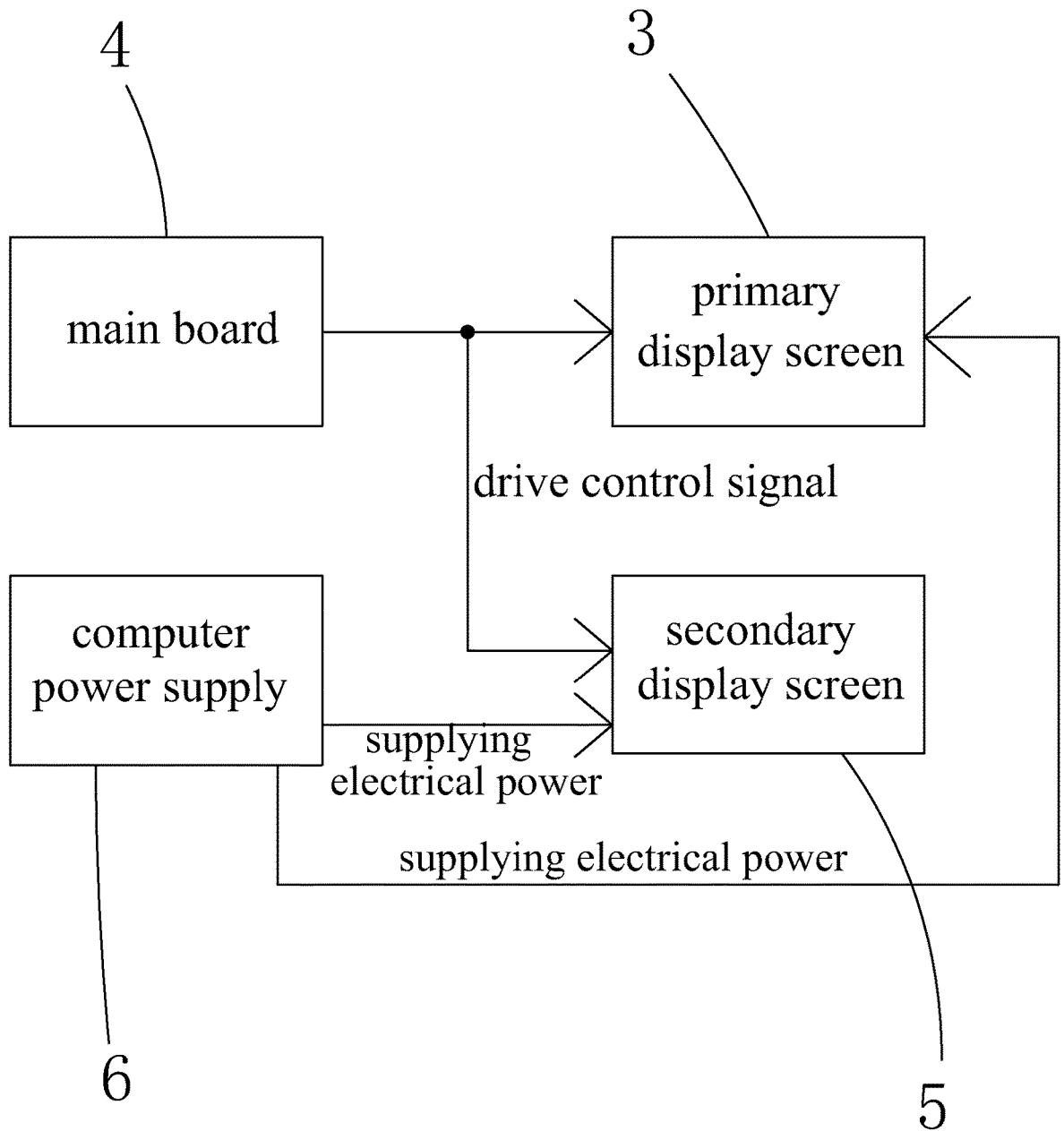
FIG. 4 is a schematic view illustrating an operation architecture of a notebook computer according to a first embodiment of the present invention.
Figure 5:
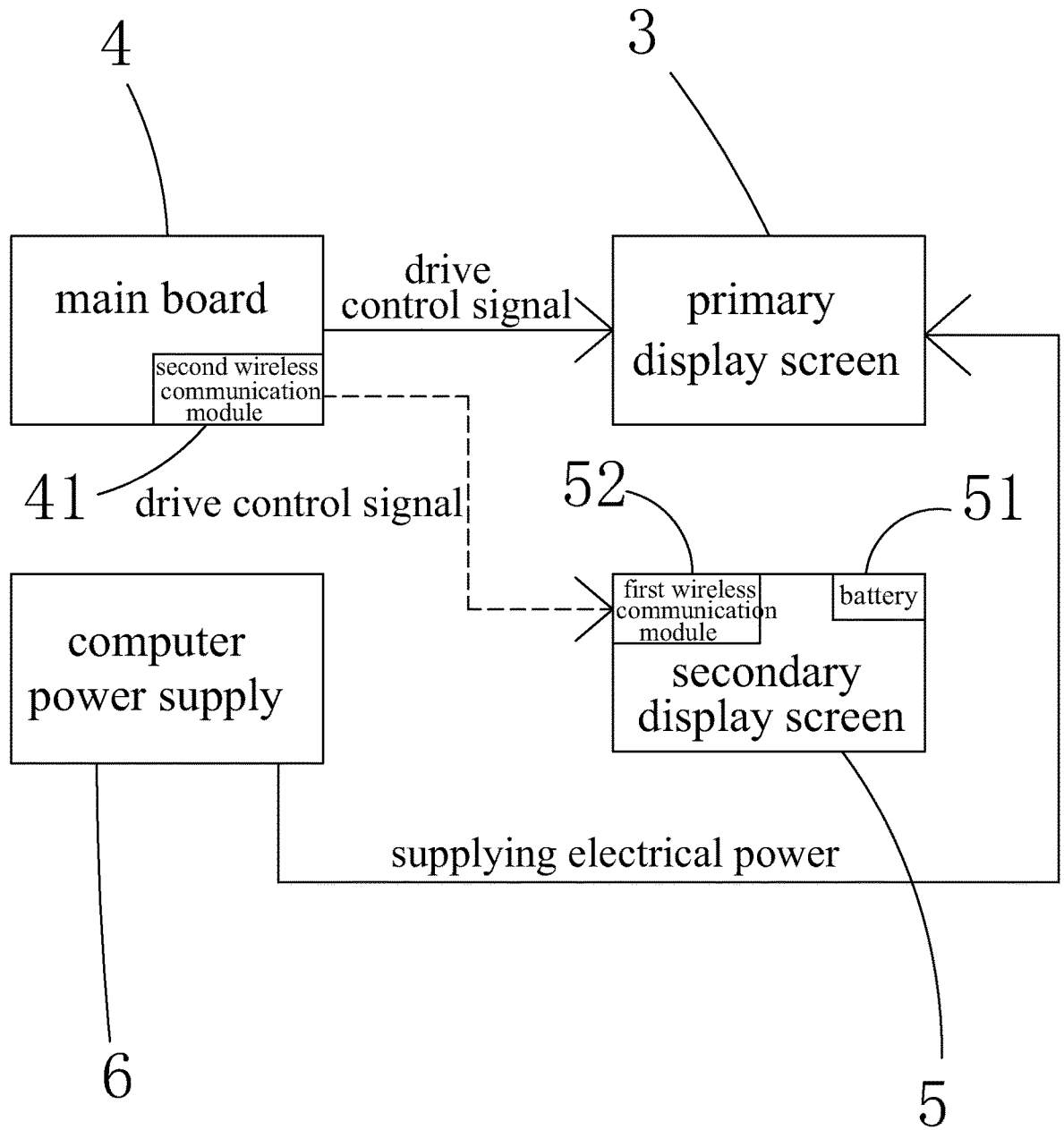
FIG. 5 is a schematic view illustrating an operation architecture of a notebook computer according to a second embodiment of the present invention.

Referring to FIGS. 2 and 3, in combination with FIGS. 4 and 5, the present invention provides a notebook computer, which comprises: a base casing 1, a top cover 2 rotatably connected to the base casing 1, a primary display screen 3 arranged in the top cover 2, a main board 4 in communication connection with the primary display screen 3, and a secondary display screen 5 in communication with the main board 4.

Preferably, the main board 4 is arranged inside the base casing 1 and the secondary display screen 5 is mounted on the base casing 1.

Specifically, referring to FIG. 3, the notebook computer further comprises a keyboard 8 and a contact type connector 7 mounted on the base casing 1 and spaced from each other and a computer power supply 6 in electrical connection with the main board 4 and the primary display screen 3. The computer power supply 6 can be a computer battery arranged inside the base casing 1 or a power supply from an external commercial power source.

It is noted here that the secondary display screen 5 is a touch display screen having a size that is smaller than that of the primary display screen 3. Preferably, the primary display screen 3 has a size that is 11-117 inches, while the secondary display screen 5 has a size that is 4-6 inches, and more preferably, the primary display screen 3 has a size of 14 inches and the secondary display screen 5 has a size of 4 inches. A touch based operation can be conducted on the secondary display screen 5 to achieve operations similar to sliding and clicking that are conventionally conducted with a computer mouse or a touch board of an existing notebook computer, so that the secondary display screen 5 may take the place of a mouse and a touch board.

It is noted that the main board 4 provides a drive control signal to achieve a control that the primary display screen 3 is operated alone, or the secondary display screen 5 is operated alone, or the primary display screen 3 and the secondary display screen 5 are operated at the same time. Specifically, the secondary display screen 5 is provided with a touch switch so that the touch switch allows for selection among the primary display screen 3 being operated alone, the secondary display screen 5 being operated alone, or the primary display screen 3 and the secondary display screen 5 being operated at the same time. In case that the operation life is insufficient or a user does not need the primary display screen 3, the primary display screen 3 can be selectively shut down to allow the secondary display screen 5 to operate alone so as to achieve a purpose of saving energy and extending operation life. In case that the user does not need the secondary display screen 5, the secondary display screen 5 can be selectively shut down to allow the primary display screen 3 to operate alone with an input operation being conducted with the keyboard 8 and an externally connected mouse; under this condition, the notebook computer operates in the same operation mode as an existing notebook computer. When both the secondary display screen 5 and the primary display screen 3 are allowed to operate at the same time, a touch control operation conducted through the secondary display screen 5 would simultaneously change the image displayed on the primary display screen 3 and under this condition, the secondary display screen 5 is not just working as a display screen and may also in existence as an input device.

Further, connection of the secondary display screen 5 can be achieved with two manners. The first one is that, referring to FIG. 4, the secondary display screen 5 is operable to establish communication with the main board 4 through the contact type connector 7 to receive the drive control signal supplied from the main board 4 and also to receive electrical power supplied from the computer power supply 6, and under this condition, the secondary display screen 5 is in rotatable connection with the contact type connector 7 to allow the secondary display screen 5 to rotate, with the contact type connector 7 as a rotational axis, so that the secondary display screen 5 can be erected, at a predetermined angle, on the base casing 1 for easy operation by the user. The second manner is that, referring to FIG. 5, the secondary display screen 5 is provided therein with a battery 51 and a first wireless communication module 52, and the main board 4 is provided with a second wireless communication module 41. The secondary display screen 5 can communicate with the main board 4 through the first wireless communication module 52 and the second wireless communication module 41 to receive the drive control signal supplied from the main board 4 and also, the secondary display screen 5 may receive electrical power from the battery 51. Under this condition, the secondary display screen 5 is detachable from the notebook computer and is operable through wireless communication so that within a range of wireless communication, the secondary display screen 5 may serve as a tablet computer and the user is allowed to do mobile operation by carrying the secondary display screen 5 to move around. Preferably, the first wireless communication module 52 and the second wireless communication module 41 are both Bluetooth communication modules. The first manner of connection and the second manner of connection can be present simultaneously to allow a user make selection among them as desired or alternatively, only one of them is provided according to the requirement of design.

Figure 6:
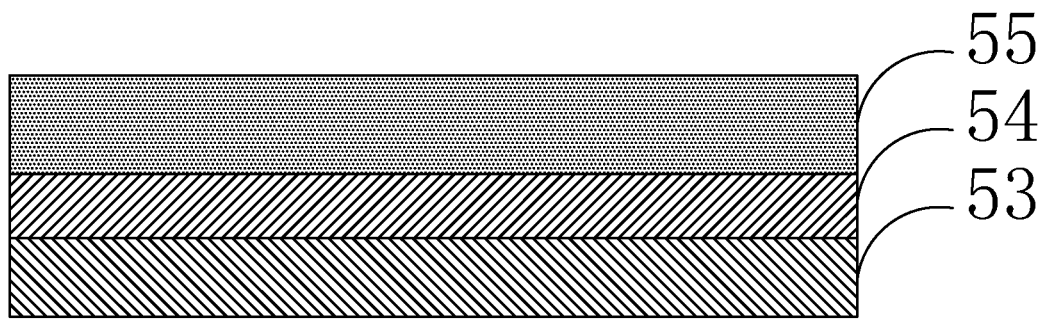
FIG. 6 is a cross-sectional view showing a secondary display screen of the notebook computer according to the present invention.

Further, to further enhance energy saving enhanced with the present invention, the secondary display screen 5 may be selectively structured as an electronic ink screen, which, as shown in FIG. 6, comprises a nanometer touch control layer 53, a solar energy layer 54, and a electronic ink layer 55 stacked on each other, wherein the electronic ink layer 55 functions to display an image; the solar energy layer 54 functions to supply electrical power to the secondary display screen 5; and the nanometer touch control layer 53 is provided for an operation of touch control. The solar energy layer 54 may generate electrical power in an environment of lighting and the secondary display screen 5 may receive electrical power from the solar energy layer 54 as a priority power source. When the solar energy layer 54 is in a light-less environment and cannot supply electrical power, then electrical power may be gained from the battery 51 or the computer power supply 6. Through a combination of the characteristic of the electronic ink screen featuring energy saving and the inclusion of the solar energy layer, the effect of energy saving achieved with the present invention may be further enhanced.

In summary, the present invention provides a notebook computer. The notebook computer comprises a secondary display screen that has a small size and a primary display screen that has a large size. The secondary display screen may be a touch display screen and is operable for solely displaying an image and conducting an input/output operation so that when the operation life of the notebook computer get short, the large-sized primary display screen can be shut down for reducing energy consumption, while the secondary display screen may be powered by the notebook computer or may be provided with an individual battery to supply electrical power thereto and may establish communication through a contact type connector with a main board of the notebook computer or communicate with the main body of the notebook computer through wireless communication modules, so that the notebook computer may possesses extended operation life and is also operable in multiple operation modes that can be selected and set by a user so as to improve user's experience and production competition power.

Based on the description given above, those having ordinary skills in the art may easily contemplate various changes and modifications of he technical solution and the technical ideas of the present invention. All these changes and modifications are considered belonging to the protection scope of the present invention as defined in the appended claims.

What is claimed is:

1. A notebook computer, comprising: a base casing, a top cover rotatably connected to the base casing, a primary display screen arranged in the top cover, a main board in communication connection with the primary display screen, and a secondary display screen in communication with the main board;
    wherein the secondary display screen is a touch display screen having a size smaller than a size of the primary display screen; and
    the main board supplies a drive control signal to selectively set the primary display screen to operate solely, or the secondary display screen to operate solely, or the primary display screen and the secondary display screen to operate simultaneously, wherein the primary display screen is selectively shut down such that the secondary display screen of which the size is smaller than the size of the primary display screen is set in operation alone with the primary screen display deactivated,
    wherein the secondary display screen is rotatably mounted on a surface of the base casing and is rotatable between a flat position where the secondary display screen lies flat on the surface of the base casing and an erect position where the secondary display screen is erected on the surface of the base casing at a predetermined angle, wherein the primary display screen arranged in the top cover and the secondary display screen are simultaneously positionable in an erected condition on the base casing in a condition of being spaced from each other.

2. The notebook computer as claimed in claim 1 further comprising a computer power supply in electrical connection with both the main board and the primary display screen.

3. The notebook computer as claimed in claim 2, wherein the base casing is provided with a contact type connector mounted thereto and the secondary display screen is operable, through the contact type connector, to communicate with the main board through and to receive electrical power from the computer power supply.

4. The notebook computer as claimed in claim 3, wherein the secondary display screen is rotatably connected to the contact type connector so that the secondary display screen is rotatable with the contact type connector as a rotation axis.

5. The notebook computer as claimed in claim 1, wherein the secondary display screen is provided with a battery and a first wireless communication module and the main board is provided with a second wireless communication module, the secondary display screen and the main board being operable to communicate with each other through the first wireless communication module and the second wireless communication module, the secondary display screen receiving electrical power from the battery.

6. The notebook computer as claimed in claim 1, wherein the secondary display screen is an electronic ink screen.

7. The notebook computer as claimed in claim 6, wherein the secondary display screen comprises a nanometer touch control layer, a solar energy layer that generates electrical power in an environment of lighting and supplies the electrical power to the second display screen, and an electronic ink layer stacked on each other.

8. The notebook computer as claimed in claim 1, wherein the secondary display screen is provided with a touch switch and the touch switch allows for selection among the primary display screen being operated solely, the secondary display screen being operated solely, or the primary display screen and the secondary display screen being operated simultaneously.

9. The notebook computer as claimed in claim 1 further comprising: a keyboard mounted on the base casing.

10. A notebook computer, comprising: a base casing, a top cover rotatably connected to the base casing, a primary display screen arranged in the top cover, a main board in communication connection with the primary display screen, and a secondary display screen in communication with the main board;
   wherein the secondary display screen is a touch display screen having a size smaller than a size of the primary display screen; and
   the main board supplies a drive control signal to selectively set the primary display screen to operate solely, or the secondary display screen to operate solely, or the primary display screen and the secondary display screen to operate simultaneously, wherein the primary display screen is selectively shut down such that the secondary display screen of which the size is smaller than the size of the primary display screen is set in operation alone with the primary screen display deactivated;
   and further comprising a computer power supply in electrical connection with both the main board and the primary display screen;
   wherein the secondary display screen is provided with a touch switch and the touch switch allows for selection among the primary display screen being operated solely, the secondary display screen being operated solely, or the primary display screen and the secondary display screen being operated at the same time; and
   wherein the secondary display screen is rotatably mounted on a surface of the base casing and is rotatable between a flat position where the secondary display screen lies flat on the surface of the base casing and an erect position where the secondary display screen is erected on the surface of the base casing at a predetermined angle, wherein the primary display screen arranged in the top cover and the secondary display screen are simultaneously positionable in an erected condition on the base casing to face toward a same side of the base casing in a condition of being spaced from each other.

11. The notebook computer as claimed in claim 10, wherein the base casing is provided with a contact type connector mounted thereto and the secondary display screen is operable, through the contact type connector, to communicate with the main board through and to receive electrical power from the computer power supply.

12. The notebook computer as claimed in claim 11, wherein the secondary display screen is rotatably connected to the contact type connector so that the secondary display screen is rotatable with the contact type connector as a rotation axis.

13. The notebook computer as claimed in claim 10, wherein the secondary display screen is provided with a battery and a first wireless communication module and the main board is provided with a second wireless communication module, the secondary display screen and the main board being operable to communicate with each other through the first wireless communication module and the second wireless communication module, the secondary display screen receiving electrical power from the battery.

14. The notebook computer as claimed in claim 10, wherein the secondary display screen is an electronic ink screen.

15. The notebook computer as claimed in claim 14, wherein the secondary display screen comprises a nanometer touch control layer, a solar energy layer that generates electrical power in an environment of lighting and supplies the electrical power to the second display screen, and an electronic ink layer stacked on each other.

16. The notebook computer as claimed in claim 10 further comprising: a keyboard mounted on the base casing.

* * * * *